United States Patent [19]
Schenkel

[11] Patent Number: 5,841,643
[45] Date of Patent: Nov. 24, 1998

[54] METHOD AND APPARATUS FOR ISOLATED FLYBACK REGULATOR CONTROL AND LOAD COMPENSATION

[75] Inventor: Jeffrey Schenkel, Burlington, Mass.

[73] Assignee: Linear Technology Corporation, Milpitas, Calif.

[21] Appl. No.: 942,451

[22] Filed: Oct. 1, 1997

[51] Int. Cl.⁶ .................................................. H02M 3/335
[52] U.S. Cl. ............................................. 363/21; 323/282
[58] Field of Search ................................. 363/20, 21, 97, 363/56, 131; 323/282, 285

[56] References Cited

U.S. PATENT DOCUMENTS

| | | | |
|---|---|---|---|
| 4,035,710 | 7/1977 | Joyce | 363/37 |
| 4,757,433 | 7/1988 | Santelmann, Jr. | 363/19 |
| 5,073,849 | 12/1991 | Morris | 363/21 |
| 5,276,604 | 1/1994 | Messman | 363/65 |
| 5,305,192 | 4/1994 | Bonte et al. | 363/21 |
| 5,422,562 | 6/1995 | Mammano et al. | 323/282 |
| 5,438,499 | 8/1995 | Bonte et al. | 363/21 |
| 5,513,088 | 4/1996 | Williamson | 363/20 |
| 5,552,695 | 9/1996 | Schwartz | 323/271 |
| 5,589,891 | 12/1996 | McCracken et al. | 348/730 |
| 5,615,092 | 3/1997 | Helfrich | 363/21 |
| 5,764,495 | 6/1998 | Faulk | 363/21 |

OTHER PUBLICATIONS

"Linear Technology LT1103/LT1105 Offline Switching Regulator," Linear Technology Corporation Data Sheet, Milpitas, California, pp. 1–28, published Oct. 1994.

"Linear Technology Initial Release Final Electrical Specifications LT1424/LT1425 Isolated Flyback Switching Regulators," Linear Technology Corporation Data Sheet, Milpitas, California, pp. 1–20, published Feb. 1997.

*Primary Examiner*—Adolf Berhane
*Attorney, Agent, or Firm*—Fish & Neave; Robert W. Morris

[57] ABSTRACT

Control circuits for a flyback switching voltage regulator that uses magnetic flux sensing are provided. These circuits include a flyback error amplifier circuit, a logic circuit, and a load compensation circuit. The flyback error amplifier circuit allows a flyback voltage pulse from a primary transformer winding to be employed for output voltage regulation. The logic circuit provides appropriate timing and control signals for the flyback error amplifier circuit. The load compensation circuit compensates for parasitic impedance contributions to the flyback voltage pulse without altering the stability of the flyback regulator.

31 Claims, 6 Drawing Sheets

METHOD AND APPARATUS FOR ISOLATED FLYBACK REGULATOR CONTROL AND LOAD COMPENSATION

BACKGROUND OF THE INVENTION

The present invention relates to switching voltage regulators, and more particularly to switching voltage regulators that use magnetic flux-sensing for output voltage regulation.

A voltage regulator is a device for providing a predetermined and substantially constant output voltage (i.e., a regulated output voltage) based on an unregulated input voltage. Switching voltage regulators (or "switching regulators") typically use one or more power transistors as a switch to provide a pulsed flow of current to a network of inductive and capacitive energy storage elements that smooth the switched current pulses into a continuous and regulated output voltage. Switching regulators can provide output voltages which are less than, greater than, or of opposite polarity to the input voltage, depending on the mode of operation of the switching regulator. They often can be implemented to a large extent using integrated circuit components, which advantageously reduces the size and complexity of the overall switching regulator circuit.

A particularly beneficial type of switching regulator is an isolated flyback switching regulator. An isolated flyback switching regulator isolates the unregulated input voltage from the regulated output voltage via a transformer. The transformer-isolated configuration advantageously prevents dangerous and/or unregulated voltages (e.g., high voltages) on the input side of the switching regulator from being coupled to the output side of the regulator, and breaks ground loops between the input and output sides of the regulator (e.g., galvanically isolates the regulator's output from the regulator's input). In operation, the isolated flyback switching regulator stores energy in the primary winding of the transformer when the regulator's switch is closed, and transfers the stored energy to the secondary winding of the regulator when the switch is opened. The transferred energy is stored in an output capacitor on the output side of the regulator and the capacitor's voltage serves as the regulated output voltage of the switching regulator.

To provide a regulated output voltage using an isolated flyback switching regulator, information indicative of the regulated output voltage of the regulator (i.e., feedback information) must be communicated to the unregulated input side of the regulator. This feedback information is used to adjust the ON-OFF duration of the switching regulator's switch so that the desired output voltage is maintained (thus keeping the output voltage regulated). For instance, if the feedback information indicated that the switching regulator's output voltage is below a desired output voltage level, the time the switch remains closed is increased. Increasing the time the switch remains closed increases the amount of energy stored in the primary winding, the amount of energy transferred to the secondary winding, and the amount of energy stored in the output capacitor. The regulated output voltage is thereby increased. Likewise, if the feedback information indicates that the switching regulator's output voltage is above the desired output voltage level, the time the switch remains closed is decreased. Decreasing the time the switch remains closed decreases the amount of energy transferred to and stored by the output capacitor, and decreases the regulated output voltage thereacross.

Several techniques are known for providing output voltage feedback information to the input side of an isolated flyback switching regulator. For instance, a sampling of the output voltage may be directly fed to the input side of the switching regulator via a resistive network. Such an arrangement, however, defeats the beneficial isolation properties of the isolated flyback switching regulator by directly coupling the regulator's input and output. To maintain isolation when a resistive network or similar direct feedback path is employed, an opto-isolator circuit may be utilized to "break" the direct path between the input and output of the isolated flyback switching regulator. Unfortunately, opto-isolator circuits are undesirable for many isolated flyback switching regulators because opto-isolators are inefficient, expensive, large and typically introduce non-linearities to a feedback signal.

Magnetic flux sensing is an alternate method for providing feedback information between the input and output sides of an isolated flyback switching regulator. In magnetic flux sensing, the magnetic flux produced within the core of the transformer during switching is sensed and used to provide feedback information about the regulator's output voltage to the input side of the regulator. Specifically, when an isolated flyback switching regulator's switch is opened, a large voltage pulse (i.e., a "flyback voltage pulse") is generated across the primary winding of the regulator's transformer. This flyback voltage pulse results from the primary winding's opposition to instantaneous changes in the magnitude of the current flowing through the primary winding. As is described below, the magnitude of the flyback voltage pulse is related to the output voltage of the isolated flyback switching regulator. Accordingly, the flyback voltage pulse may be used to provide feedback information about the regulator's output voltage to the input side of the regulator.

The flyback voltage pulse generated across the primary winding of the transformer must be normalized (e.g., via subtraction of the unregulated input voltage from the flyback voltage pulse) to provide feedback information. As such, conventional isolated flyback switching regulators do not derive feedback information directly from the primary winding of the regulator's transformer. Instead, a lower voltage auxiliary (or bias) winding is provided that generates a normalized flyback voltage pulse on the input side of the regulator. The desired feedback information is derived from the auxiliary winding's normalized flyback voltage pulse.

While the addition of an auxiliary transformer winding simplifies the use of magnetic flux sensing, problems still exist that degrade the performance of isolated flyback switching regulators employing this technique. For instance, extra transformer windings increase the cost and size of an isolated flyback switching regulator and decrease a regulator's dynamic response time. As well, parasitic impedances present within the output circuitry of isolated flyback switching regulators degrade the accuracy with which the output voltage may be represented by a flyback voltage pulse. The amount of accuracy degradation is load current sensitive, with larger load currents introducing larger parasitic impedance contributions to the flyback voltage pulse (further decreasing the accuracy with which an output voltage may be represented by a flyback voltage pulse). A complete discussion of the problems associated with conventional magnetic flux sensing switching regulator topologies is provided in commonly assigned U.S. Pat. No. 5,438,499, the entire contents of which are hereby incorporated by reference.

As a consequence of the convoluted relationship between the regulated output voltage of an isolated flyback switching regulator and its associated flyback voltage pulse, switching regulators employing magnetic flux sensing continue to exhibit poor voltage regulation characteristics. Even isolated flyback switching regulators that compensate for parasitic impedance inaccuracies in a flyback voltage pulse (e.g., with load compensation) exhibit output voltage regulation instabilities.

A need therefore exists for a method and apparatus for improving the regulation characteristics of isolated flyback switching regulators employing magnetic flux sensing that do not require auxiliary transformer windings and that reduce the parasitic impedance induced inaccuracies inherent in the magnetic flux sensing technique.

It is therefore an object of the present invention to provide methods and apparatus that allow isolated flyback switching regulators to employ non-auxiliary winding magnetic flux sensing.

It is also an object of the present invention to provide isolated flyback switching regulator methods and apparatus that avoid the parasitic impedance induced inaccuracies inherent in known magnetic flux sensing techniques.

SUMMARY OF THE INVENTION

These and other objects of the present invention are accomplished with a number of novel switching regulator circuit embodiments. These novel circuits include: a flyback error amplifier circuit, a logic circuit and a load compensation circuit that replace (or add to) analogous components in conventional isolated flyback switching regulators or similar switching regulators.

The novel flyback error amplifier circuit comprises a scaling circuit that scales a flyback voltage pulse generated across a transformer winding of an isolation flyback switching regulator. The flyback voltage pulse may be derived directly from a primary winding of the transformer if so desired. Alternatively, the flyback voltage pulse may be derived from a third (bias) winding. The scaling of the flyback voltage pulse is preferably performed by converting the flyback voltage pulse to a flyback current, and then converting the flyback current to a scaled flyback voltage pulse with an impedance element (such as a ground-referenced resistor).

Once scaled, adjustment circuitry with the flyback error amplifier circuit compares the flyback voltage pulse to an internal reference voltage (e.g., a bandgap voltage). A difference signal is produced based on this comparison. Thereafter, a portion of the difference signal is integrated and used to adjust the ON-OFF cycle of the switch associated with the isolated flyback switching regulator. Preferably, the ON-OFF cycle of the switch is adjusted by adjusting the current mode trip point of the isolated flyback switching regulator. Accordingly, if the internal reference voltage is less than the scaled flyback voltage pulse, the current mode trip point of the isolated flyback switching regulator is reduced so as to decrease the regulated output voltage of the regulator. Otherwise, if the internal reference voltage is greater than the scaled flyback voltage pulse, the current mode trip point is increased so as to increase the regulated output voltage of the regulator.

In a preferred embodiment, the current mode trip point of the isolated flyback switching regulator equals the voltage across a capacitor, and the difference signal is a difference current. This difference current is subtracted from a fixed current (which is output from a fixed current source) to produce a charging current. The current mode trip point of the isolated flyback switching regulator is adjusted by changing the charged state of the capacitor with the charging current. That is, the capacitor has its charge state altered over time by the charging current (i.e., the capacitor integrates the charging current).

The novel logic circuit comprises an enabling circuit for enabling the adjustment circuitry while the flyback voltage pulse is present (e.g., when the regulator's switch is open) and disabling a portion of the adjustment circuitry while the flyback voltage pulse is absent (e.g., when the regulator's switch is closed). The enabling circuit includes an enable delay (e.g., a first one-shot) for maintaining the adjustment circuitry in a disabled state during a first portion of the flyback voltage pulse (e.g., the portion of the flyback voltage pulse dominated by primary winding leakage inductance non-linearities). Also, to allow the adjustment circuitry (e.g., the capacitor used to set the current mode trip point) to charge when the output voltage is abnormally low (e.g., during startup), the enabling circuit maintains the flyback error amplifier in an enabled state for a minimum enable time. This is accomplished via a minimum enable time circuit (e.g., a second one-shot) located within the enabling circuit.

Once the flyback voltage pulse collapses, the enabling circuit disables a portion of the adjustment circuitry of the flyback error amplifier. This is accomplished via a collapse comparator within the enabling circuit. The collapse comparator compares the flyback voltage pulse to a fixed reference level (e.g., 80% of a bandgap voltage) and, once the flyback voltage pulse falls below the fixed reference level, generates a collapse signal that causes the enabling circuit to disable a portion of the adjustment circuitry.

The novel load compensation circuit compensates for discrepancies between the flyback voltage pulse's prediction of the output voltage and the actual output voltage of the isolated flyback switching regulator. These discrepancies arise from the non-zero parasitic impedances present on the output side of the switching regulator (e.g., parasitic impedances primarily from capacitive and inductive elements). The load compensation circuit contains a current-to-voltage converter for generating a compensation voltage based on the input current flowing through the input side of the switching regulator's transformer (e.g., the current flowing through the primary winding of the transformer as well as through the regulator's switch). The compensation voltage, may for instance, be generated via a sense resistor within the path of the input current. The compensation voltage is low pass filtered so that it represents an "average" of the input current flowing through the switching regulator's switch. The filtered compensation voltage is then used to adjust the magnitude of the flyback voltage pulse so as to compensate for contributions to the flyback voltage pulse from parasitic impedances on the output side of the switching regulator. For instance, the filtered compensation voltage may be used to generate a compensation current that is subtracted from the flyback current prior to generating the scaled flyback voltage pulse.

The above described circuits can be incorporated together into a single switching regulator circuit, or can be used in various combinations with other types of circuitry. In a preferred embodiment the flyback error amplifier circuit, the load compensation circuit, and the logic circuit are implemented as a single integrated circuit switching regulator control device.

DETAILED DESCRIPTION OF THE PREFERRED EMBODIMENTS

Figure 1:
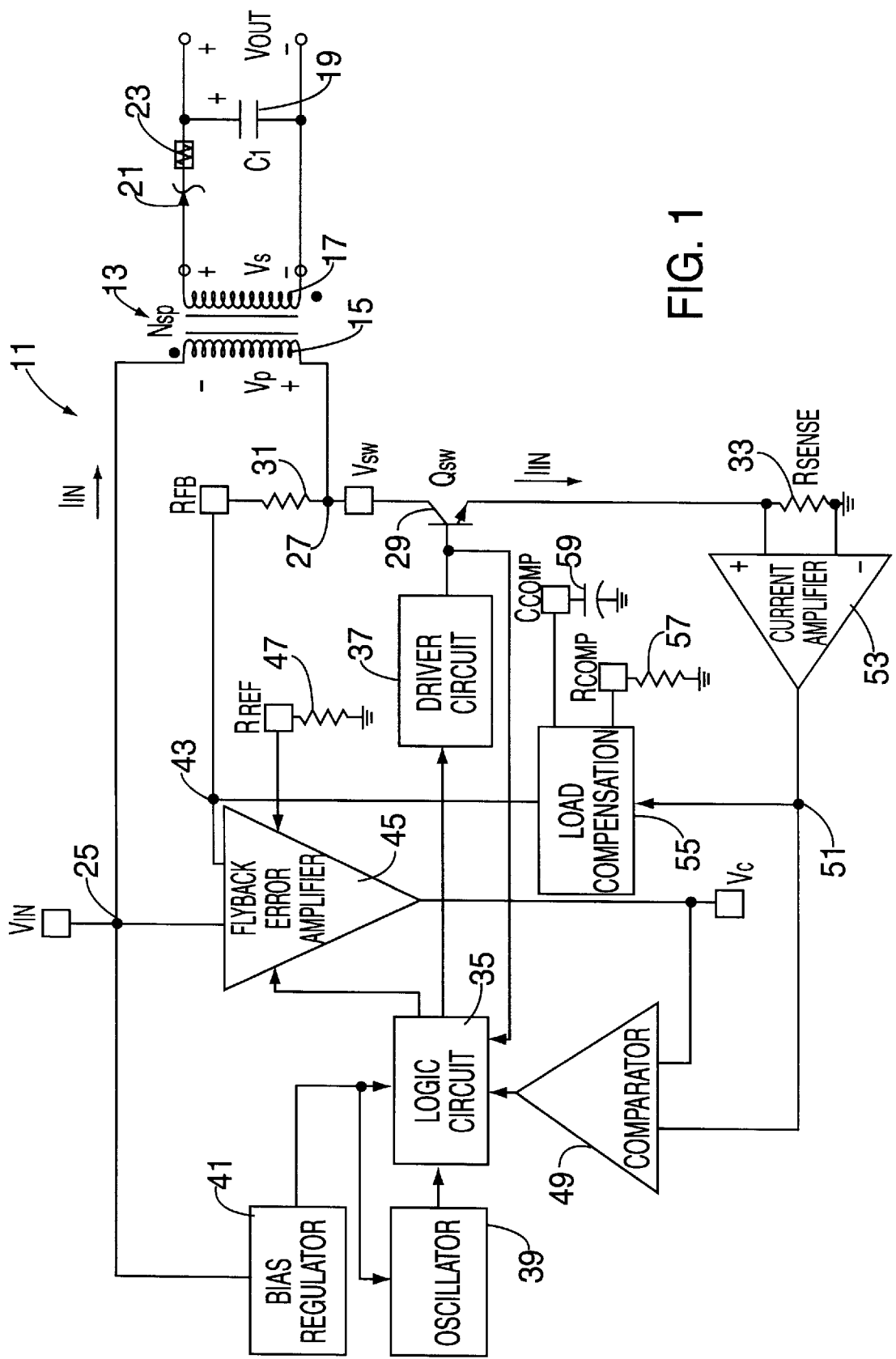
FIG. 1 is a schematic block diagram of an illustrative flyback regulator employing principles of he present invention.

FIG. 1 is a block diagram of an isolated flyback switching regulator 11 employing the principles of the present invention. Flyback regulator 11 provides isolation between an unregulated input voltage ($V_{IN}$) and a regulated output voltage ($V_{OUT}$) via transformer 13 having primary winding 15 and secondary winding 17. The transformer turns ratio from secondary winding 17 to primary winding 15 is $N_{Sp}$. The voltage across primary winding 15 is designated $V_P$, while the voltage across secondary winding 17 is designated $V_S$.

$V_{OUT}$ of flyback regulator 11 is developed across output capacitor 19. Output capacitor 19 is series coupled to secondary winding 17 through output diode 21 and lumped sum impedance 23. Lumped sum impedance 23 represents the lumped sum equivalent parasitic impedance contributions from output capacitor 19, output diode 21 and secondary winding 17.

On the primary side of transformer 13 (at a node 25), $V_{IN}$ is fed to one end of primary winding 15. The other end of primary winding 15 is connected to a node 27 that connects primary winding 15 to the collector of switching transistor 29 and to feedback resistor 31. The emitter of switching transistor 29 is connected to ground through sense resistor 33.

The ON-OFF state of switching transistor 29 is controlled by logic circuit 35, which is connected to the base of switching transistor 29 via driver circuit 37. Oscillator 39 provides a clock signal to logic circuit 35, and bias regulator 41 (which is also connected to node 25) powers both logic circuit 35 and oscillator 39 from $V_{IN}$.

As further described below, when switching transistor 29 turns off, a flyback voltage pulse develops across primary winding 15. This flyback voltage pulse is fed through feedback resistor 31 (connected between node 27 and node 43) to flyback error amplifier 45. Feedback resistor 31 thus creates a path for the flyback voltage pulse from primary winding 15 to flyback error amplifier 45. While reference resistor 47 (for generating a reference voltage related to the magnitude of the flyback voltage pulse, as described below) is shown external to flyback error amplifier 45, it may be configured to be internal to flyback error amplifier 45 if so desired.

In addition to receiving the flyback voltage pulse from primary winding 15, flyback error amplifier 45 also receives $V_{IN}$ through node 25 and control signals from logic circuit 35. Based on the flyback voltage pulse from primary winding 15, $V_{IN}$ from node 25 and the control signals from logic circuit 35, flyback error amplifier 45 generates a control voltage ($V_C$) which is input to comparator 49.

Comparator 49 compares $V_C$ to an amplified sense voltage produced at node 51. The amplified sense voltage is produced when switching transistor 29 is turned ON and current flows through switching transistor 29 and sense resistor 33. The current flowing through sense resistor 33 generates a sense voltage (proportional to the current flowing through switching transistor 29) across sense resistor 33. This sense voltage is amplified by current amplifier 53 and is fed to comparator 49 via node 51. As described below, when the amplified sense voltage exceeds $V_C$, comparator 49 sends a switch turnoff signal to logic circuit 35.

Node 51 also feeds the amplified sense voltage (from current amplifier 53) to load compensation circuit 55 which is connected between nodes 43 and 51. Upon receiving the amplified sense voltage, load compensation circuit 55 uses compensation resistor 57, compensation capacitor 59, and the amplified sense voltage to generate a compensation current. As further described below, the compensation current reduces the magnitude of the flyback voltage pulse fed from primary winding 15 to flyback error amplifier 45 to compensate for contributions to the flyback voltage pulse from lumped sum impedance 23.

The general operation of flyback regulator 11 is now provided. Oscillator 39 outputs a voltage pulse train at a known frequency (e.g., 275 kHz). This voltage pulse train is used as a clock signal by logic circuit 35. Absent a switch turnoff signal from comparator 49 (described below), logic circuit 35 uses the voltage pulse train to switch (via driver circuit 37) switching transistor 29 ON and OFF at the same frequency as the voltage pulse train.

When switching transistor 29 is turned ON by logic circuit 35, $V_{IN}$ biases primary winding 15 and generates a negative primary winding voltage ($V_P$) thereacross. An input current results which linearly increases with time (i.e., ramps) and which flows through primary winding 15, switching transistor 29, and sense resistor 33 to ground. As a result of $V_P$, a negative secondary winding voltage ($V_S$) is produced across secondary winding 17 which reverse biases output diode 21 and precludes current flow to output capacitor 19. During this time period, energy from $V_{IN}$ is transferred to and is stored in primary winding 15. In response to the input current, sense resistor 33 generates a sense voltage. The sense voltage is amplified by current amplifier 53 and fed to both comparator 49 and load compensation circuit 55 via node 51.

When switching transistor 29 turns OFF, the energy stored in primary winding 15 is transferred to secondary winding 17 and stored in output capacitor 19. Output capacitor 19 effectively averages the current on the secondary of transformer 13. The DC average voltage across output capacitor 19 serves as $V_{OUT}$ of flyback regulator 11. Accordingly, the duration of the time switching transistor 29 is turned ON relative to the duration of the time switching transistor 29 is turned OFF determines the output voltage developed across output capacitor 19 (and thus $V_{out}$).

When switching transistor 29 turns ON prior to the transfer of all energy from primary winding 15 to secondary winding 17, flyback regulator 11 is said to operate in a continuous mode. On the other hand, when switching transistor 29 turns ON after the transfer of all energy from primary winding 15 to secondary winding 17, flyback regulator 11 is said to operate in a discontinuous mode. Both continuous and discontinuous modes may be used with the novel circuits of the present invention.

Output voltage regulation within flyback regulator 11 is achieved via three feedback loops. The first and fastest feedback loop comprises primary winding 15, switching transistor 29, sense resistor 33, current amplifier 53, comparator 49 and logic circuit 35. These components form a "current mode" feedback loop that operates while switching transistor 29 is turned ON. As previously indicated, sense resistor 33 measures the input current flowing through switching transistor 29 and generates a sense voltage proportional thereto. This sense voltage is amplified by current amplifier 53 and fed to comparator 49. Comparator 49 then compares the sense voltage to $V_C$ (which serves as the current mode trip point of flyback regulator 11). When the sense voltage exceeds $V_C$, comparator 49 generates a switch turnoff signal which is fed to logic circuit 35. In response to the switch turnoff signal, logic circuit 35 turns OFF switching transistor 29, cutting short the ON cycle of switching transistor 29 set by oscillator 39. This first feedback loop prevents $V_{OUT}$ from exceeding a desired voltage level by allowing only the "proper" amount of energy to be stored within primary winding 15. That is, assuming $V_c$ is properly set, the first feedback loop ensures that only the amount of energy required to maintain output capacitor 19 charged to the desired regulated output voltage ($V_{OUT}$) is stored within primary winding 15 before switching transistor 29 is turned OFF.

The second feedback loop consists of primary winding 15, feedback resistor 31, flyback error amplifier 45, comparator 49 and logic circuit 35. This second feedback loop gathers regulated output voltage information (e.g., feedback information) while switching transistor 29 is turned OFF. As described in detail below, a flyback voltage pulse is generated across primary winding 15 when switching transistor 29 is turned OFF. The magnitude of the flyback voltage pulse ($V_{FLBK}$) is related to $V_{OUT}$ across output capacitor 19 by the turns ratio ($N_{SP}$) of transformer 13 via the equation:

$$V_{FLBK} = \frac{(V_{out} + V_F + I_{SEC}ESR)}{N_{sp}} \quad (1)$$

where $V_F$ is the forward voltage diode drop of output diode 21, $I_{SEC}$ is the current flowing through secondary winding 17, and ESR is lump sum impedance 23. Solving for $V_{OUT}$ in terms of $V_{FLBK}$ yields:

$$V_{out} = N_{sp}V_{FLBK} - V_F - I_{SEC}ESR \quad (2)$$

Within the second feedback loop, the flyback voltage pulse is fed to flyback error amplifier 45 via feedback resistor 31. Upon arrival at flyback error amplifier 45, the flyback voltage pulse is scaled and compared to an internal reference voltage (as described further below with reference to FIG. 2). Based on this comparison, $V_C$ (and thus the current mode trip point of flyback regulator 11) is adjusted to regulate $V_{OUT}$. For example, if $V_{OUT}$ (as indicated by the flyback voltage pulse) is above the desired output voltage level, $V_C$ is decreased. Decreasing $V_c$ decreases the magnitude of the sense voltage (produced across sense resistor 33) required for comparator 49 to generate a switch turnoff signal. The ON time of switching transistor 29 is therefore reduced. Accordingly, less energy is stored in primary winding 15 and less energy is transferred to output capacitor 19 when switching transistor 29 is turned OFF. As such, $V_{OUT}$ decreases. Likewise, if the $V_{OUT}$ is below the desired output voltage level, $V_C$ is increased. Increasing $V_C$ increases the magnitude of sense voltage required for comparator 49 to generate a switch turnoff signal. This increases the time switching transistor 29 is turned ON and increases the amount of energy stored in primary winding 15. More energy is therefore transferred to output capacitor 19 when switching transistor 29 is turned OFF, and $V_{OUT}$ is increased.

The third and slowest feedback loop consists of primary winding 15, switching transistor 29, sense resistor 33, current amplifier 53 and load compensation circuit 55. As with the first feedback path, sense resistor 33 measures the input current flowing through switching transistor 29 and generates a sense voltage proportional thereto. This sense voltage is amplified by current amplifier 53 and is fed to load compensation circuit 55. As is described below with reference to FIG. 4, load compensation circuit 55 averages the amplified sense voltage, producing a measure of the average input current flowing through switching transistor 29. Based on the averaged sense voltage, a compensation current is generated which compensates for flyback voltage pulse contributions from lumped sum impedance 23. Compensation is performed by reducing the magnitude of the flyback voltage pulse with compensation current at node 43. A significant advantage of load compensation circuit 55 is that it provides load compensation which is essentially independent of the first and second feedback loops. The feedback loop stability of the first and second feedback loops is therefore unaffected by load compensation circuit 55.

The novel flyback error amplifier circuit, logic circuit, and load compensation circuit are now described with reference to FIGS. 2–4.

Figure 2A:
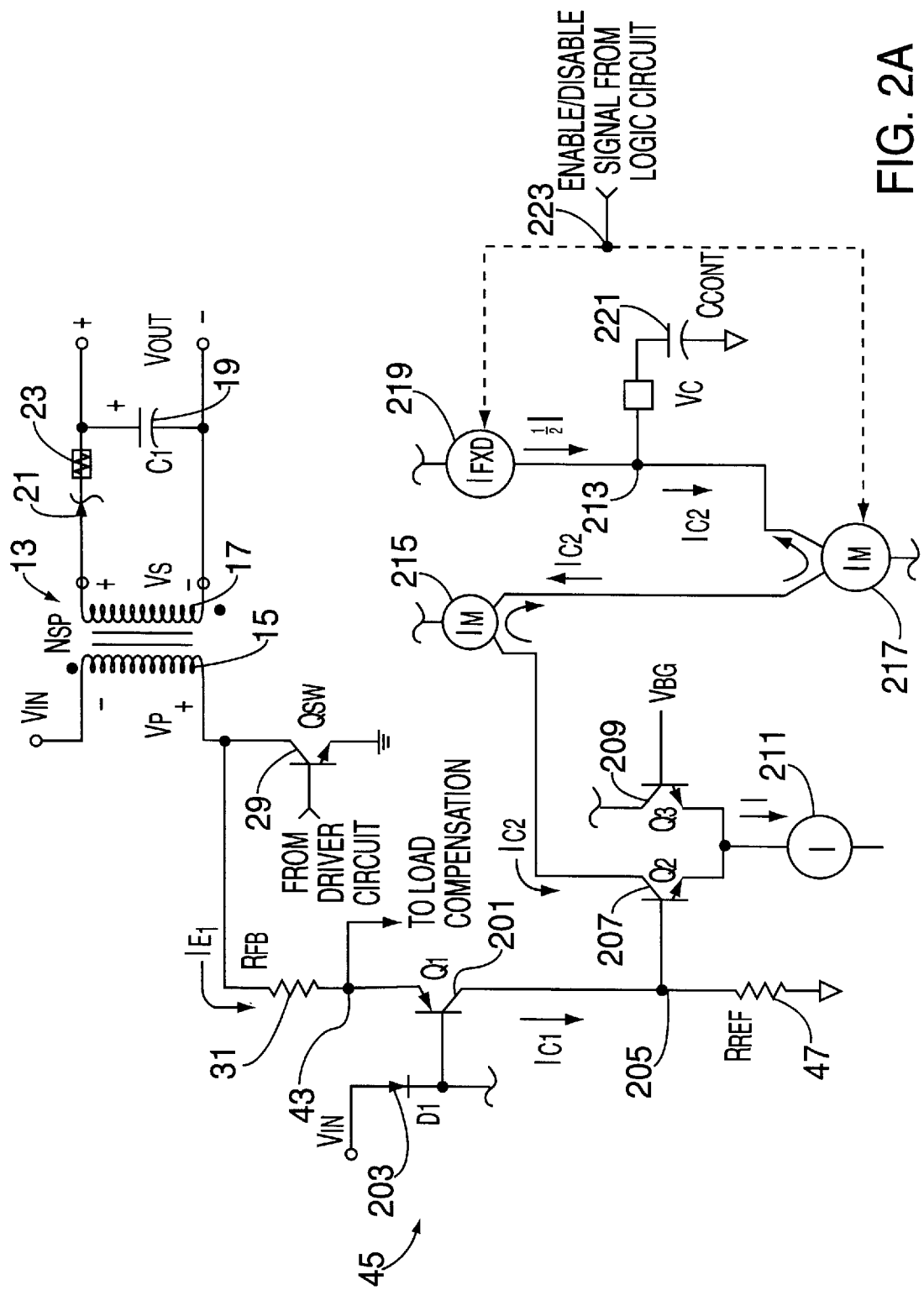
FIG. 2A is a schematic diagram of an embodiment of the flyback error amplifier of FIG. 1.

FIG. 2A shows a schematic diagram of an embodiment of flyback error amplifier 45 of FIG. 1. Flyback error amplifier 45 comprises transistor 201 having an emitter coupled to primary winding 15 via feedback resistor 31. (Note that feedback resistor 31 may be part of flyback error amplifier 45 if so desired.) The base of transistor 201 is coupled to $V_{IN}$ through diode 203. Diode 203 is selected to have a forward voltage ($V_{D1}$) similar to the forward voltage ($V_{BE1}$) of the emitter-base diode of transistor 201. In this manner, node 43 is maintained at approximately $V_{IN}$.

The collector of transistor 201 is connected to ground through reference node 205 and reference resistor 47. As stated above, reference resistor 47 may be part of, or separate from, feedback error amplifier 45.

The base of transistor 207 is also connected to reference node 205. Transistor 207 forms a differential amplifier transistor pair with transistor 209 and current source 211, which is coupled to the emitters of transistors 207 and 209. The base of transistor 209 is connected to an internal reference voltage (e.g., a bandgap voltage ($V_{BG}$)).

The collector of transistor 207 is connected to control voltage node 213 through current mirrors 215 and 217. Fixed current source 219 and control voltage capacitor 221 are also connected to control voltage node 213. The voltage across control voltage capacitor 221 serves as $V_C$ for flyback regulator 11 of FIG. 1.

The operation of flyback error amplifier 45 is as follows. As previously stated, when switching transistor 29 turns ON, current flows through primary winding 15 and energy is stored therein. A negative voltage develops across primary winding 15 that induces a negative voltage across secondary winding 17 (as indicated by the "dot" convention of transformer 13).

When switching transistor 29 turns OFF, a positive voltage pulse (the flyback voltage pulse) develops across primary winding 15 to oppose any change in the magnitude of the current flowing through primary winding 15. The flyback voltage pulse induces a positive voltage across secondary winding 17. As previously indicated, the magnitude of the flyback voltage pulse is:

$$V_{FLBK} = \frac{(V_{out} + V_F + I_{SEC}ESR)}{N_{sp}}$$

The flyback voltage pulse travels to feedback error amplifier 45 through feedback resistor 31 ($R_{FB}$). Because node 43 is maintained at a voltage near $V_{IN}$, the emitter current of transistor 201 ($I_{E1}$) approximately equals:

$$I_{E1} = \frac{-V_p}{R_{FB}} = \frac{V_{FLBK}}{R_{FB}} \qquad (3)$$

Feedback resistor 31 therefore serves as a voltage-to-current converter that converts the flyback voltage pulse from primary winding 15 to a flyback current (current $I_{E1}$) The corresponding collector current of transistor 201 ($I_{C1}$) is related to $I_{E1}$, by the ratio of the collector current to the emitter current ($\alpha$):

$$I_{C1} = \alpha I_{E1} = \frac{\alpha V_{FLBK}}{R_{FB}} \qquad (4)$$

The majority of $I_{C1}$ travels to ground through reference resistor 47. A flyback reference voltage ($V_{FBREF}$) (e.g., a scaled version of the original flyback voltage pulse) is thereby generated across reference resistor 47 at reference node 205 with a magnitude equal to:

$$V_{FBREF} = \frac{\alpha V_{FLBK} R_{REF}}{R_{FB}} \qquad (5)$$

solving equation (5) for $V_{FLBK}$ yields:

$$V_{FLBK} = \frac{V_{FBREF} R_{FB}}{\alpha R_{REF}} \qquad (6)$$

The flyback reference voltage ($V_{FBREF}$) generated at reference node 205 is coupled to the base of transistor 207. The differential amplifier transistor pair formed by transistors 207 and 209, and current source 211 compares VFBREF to the internal reference voltage at the base of transistor 209 and produces a collector current within transistor 207 ($I_{C2}$) related to the comparison. Namely, if $V_{FBREF}$ equals the internal reference voltage, transistors 207 and 209 are biased identically and collector current $I_{C2}$ equals approximately half of the current (I) produced by current source 211. As such, $I_{C2}=\frac{1}{2}I$. If, however, the flyback reference voltage at reference node 205 is greater than the internal reference voltage, transistor 207 is biased more strongly than transistor 209. Accordingly, more current flows through transistor 207 and $I_{C2}$ exceeds ½I. Likewise, if the flyback reference voltage at reference node 205 is less than the internal reference voltage, transistor 207 is more lightly biased than transistor 209 and $I_{C2}$ falls below ½I.

$I_{C2}$ serves as a "difference signal" indicating that the flyback reference voltage present at reference node 205 is different from the internal reference voltage present at the base of transistor 209 when $I_{C2}$ differs from ½I. $I_{C2}$ is mirrored to control voltage node 213 by current mirrors 215 and 217 as shown in FIG. 2.

At control voltage node 213, fixed current source 219 produces a fixed current with a magnitude equaling ½I. $I_{C2}$ is subtracted from the fixed current (½I) produced by fixed current source 219. As such, when $I_{C2}$ exceeds ½I (indicating that the flyback reference voltage is greater than the internal reference voltage), charge is removed from control voltage capacitor 221 and $V_C$ is reduced. By reducing $V_C$, $V_{OUT}$ decreases and the magnitude of the flyback voltage pulse decreases. Accordingly, the difference between the flyback reference voltage and the internal reference voltage decreases, and $I_{C2}$ approaches ½I.

Likewise, when $I_{C2}$ is less than ½I (indicating the flyback reference voltage is less than the internal reference voltage), current flows into control voltage capacitor 221 and both the charge stored by control voltage capacitor 221 and $V_C$ increase. As $V_C$ increases, so do $V_{OUT}$ and the magnitude of the flyback voltage pulse. The difference between the flyback reference voltage and the internal reference voltage decreases, and $I_{C2}$ approaches ½I.

Thus, through the feedback loop formed by primary winding 15, feedback resistor 31, first transistor 201, reference resistor 47, second transistor 207, third transistor 209, first current mirror 215, second current mirror 217, fixed current source 219 and control voltage capacitor 221, the flyback reference voltage at reference node 205 is maintained near the internal reference voltage ($V_{BG}$). From equation (6), the magnitude of the flyback voltage pulse ($V_{FLBK}$) is therefore related to the internal reference voltage ($V_{BG}$) by the expression:

$$V_{FLBK} = \frac{V_{BG} R_{FB}}{\alpha R_{REF}} \qquad (7)$$

Combining the expression for the flyback voltage pulse ($V_{FLBK}$) with equation (2) for ($V_{OUT}$) yields:

$$V_{out} = \frac{N_{sp} V_{BG} R_{FB}}{\alpha R_{REF}} - V_F - I_{SEC}ESR \qquad (8)$$

Equation (8) may be used to compute the ratio of $R_{FB}$ to $R_{REF}$ (ignoring the contributions from lumped sum impedance 23 (ESR)) for a desired $V_{out}$.

For flyback error amplifier 45 of FIG. 2A to work properly, a flyback voltage pulse must be present. If, for example, no flyback voltage pulse is present on primary winding 15, no flyback reference voltage will be generated at reference node 205, transistor 207 turns OFF and IC2 drops to zero. As such, control voltage capacitor 221 continuously charges with the fixed current from fixed current source 219 and $V_c$ ramps in value. $V_{out}$ similarly ramps (e.g., will no longer be regulated). Accordingly, for proper operation of flyback regulator 11, a portion of flyback error amplifier 45 must be disabled when the flyback voltage pulse is absent.

As shown in FIG. 2A, an enable/disable signal is fed from logic circuit 35 (FIG. 1) to fixed current source 219 and current mirror 217 via enable node 223. As described below with respect to FIGS. 3A and 3B, when the flyback voltage pulse is absent, the enable/disable signal disables fixed current source 219 and current mirror 217. In this manner, $V_c$ present across control voltage capacitor 221 is maintained while the flyback voltage pulse is absent.

In certain applications (e.g., for "off-line" regulators employing large unregulated input voltages) it is often desirable to power the control circuitry (e.g., oscillator 39, logic circuit 35, and the like) for a switching regulator via a third (bias) winding. Specifically, such a bias winding can be configured via transformer turns ratio to supply a voltage for the control circuitry which is much less than the unregulated input voltage that otherwise powers the circuitry. Such an arrangement greatly reduces the quiescent power requirements of the control circuitry (increasing its efficiency) and reduces the heat dissipation associated with quiescent power consumption. When quiescent power consumption/heat dissipation are a concern, the additional cost and size associated with a bias winding may be unavoidable.

In situations where a bias winding exists, an alternative embodiment of flyback error amplifier 45 may be employed. In particular, a scaled, ground-referenced flyback voltage pulse may be produced by a simple resistive divider between the bias winding and ground.

Figure 2B:
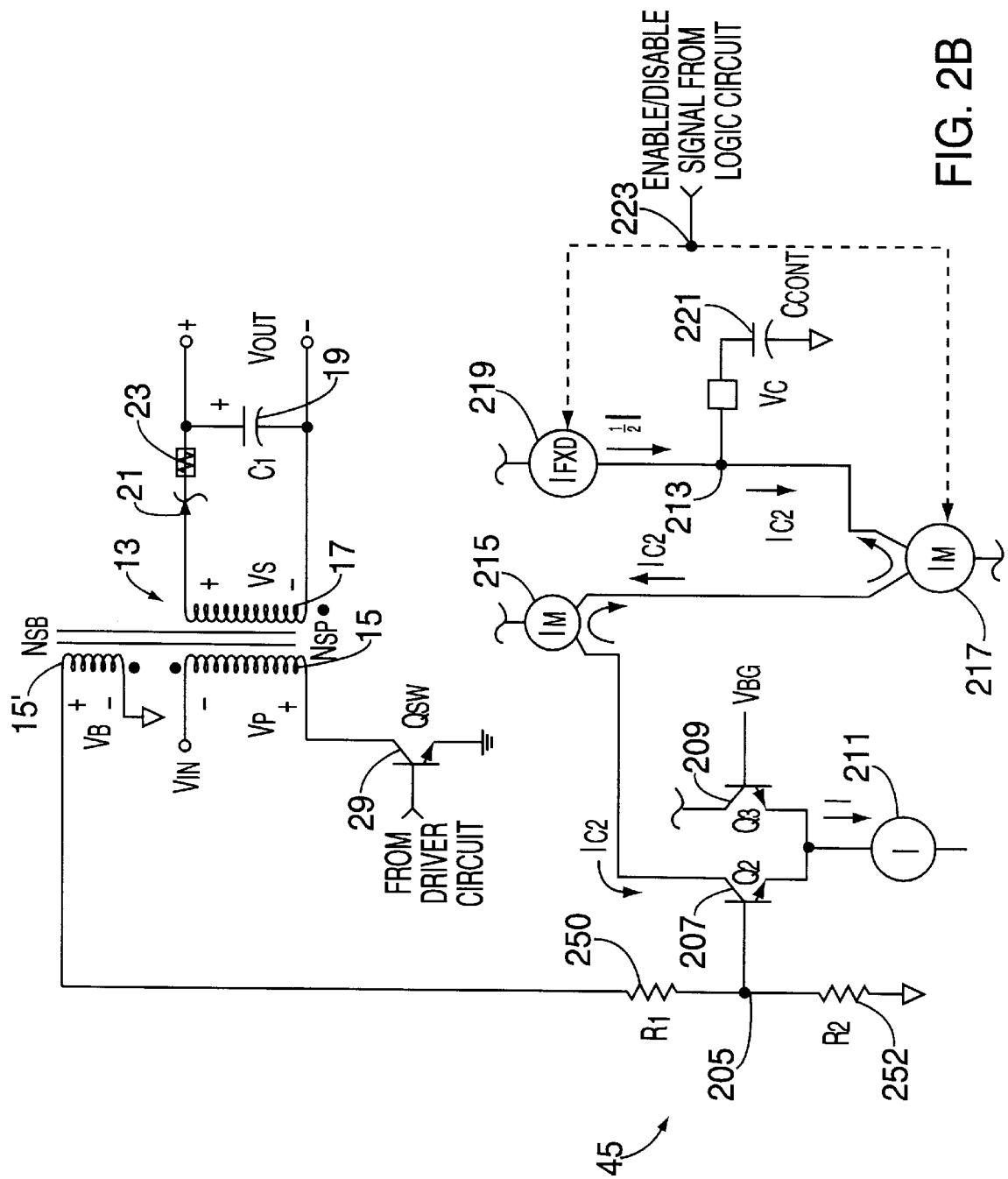
FIG. 2B is a schematic diagram of an alternative embodiment of the flyback error amplifier of FIG. 1.

FIG. 2B shows a schematic diagram of an alternative embodiment of flyback error amplifier 45 of FIG. 1 wherein the flyback voltage pulse is derived from bias winding 15'. Bias winding 15' is connected to reference node 205 via resistor 250, and reference node 205 is connected to ground through resistor 252. As node 43 of FIGS. 1 and 2A no longer exists, load compensation, if desired, can be provided through a similar, but alternative means as described below with reference to FIG. 4.

When employing bias winding 15', feedback resistor 31, reference resistor 47, transistor 201, and diode 203 of FIG. 2A are eliminated. The remaining components in flyback error amplifier 45 of FIG. 2B are identical to and operate the same as the components described in FIG. 2A. As such, only the operation of bias winding 15', resistor 250, and resistor 252 is described.

When switching transistor 29 turns OFF, a flyback voltage pulse is produced across both primary winding 15 and bias winding 15'. The magnitude of the flyback voltage pulse produced across bias winding 15' ($V_B$) is similar to the flyback voltage pulse magnitude predicted by equation (1), with $N_{SP}$ replaced by the turns ratio from secondary winding 17 to bias winding 15' ($N_{SB}$)

$$V_B = \frac{(V_{out} + V_F + I_{SEC}ESR)}{N_{SB}} \tag{9}$$

$V_B$ is scaled by a resistor divider formed from resistor 250 ($R_1$) and resistor 252 ($R_2$). This resistor divider produces a flyback reference voltage at node 205 ($V_{FBREF}$). Assuming no load compensation is employed, $V_{FBREF}$ is given by:

$$V_{FBREF} = \frac{R_2 V_B}{R_1 + R_2} \tag{10}$$

$V_{FBREF}$ is compared to the internal reference voltage at the base of transistor 209 and $V_C$ is adjusted as described with reference to FIG. 2A.

Figure 3A:
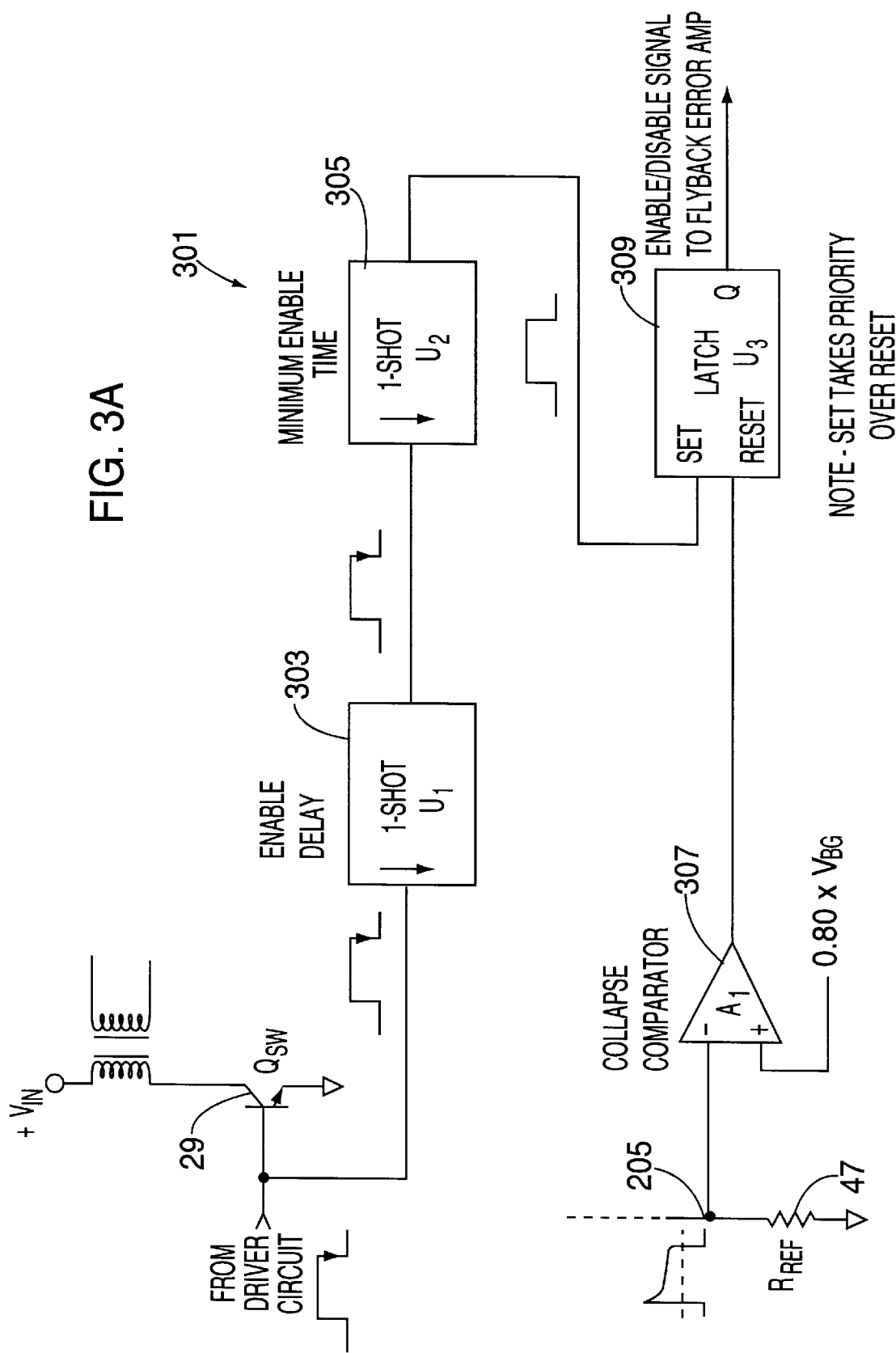
FIG. 3A is a schematic block diagram of an embodiment of an enable/disable circuit forming part of the logic circuit of FIG. 1.

FIG. 3A shows a schematic diagram of enable/disable circuit 301 responsible for enabling/disabling flyback error amplifier 45. Enable/disable circuit 301 forms a portion of logic circuit 35 and comprises one shots 303 and 305, collapse comparator 307 and latch 309 (e.g., a flip-flop). One shots 303 and 305 are preferably monostable multivibrators. Latch 309, when set, outputs an enable/disable signal which enables fixed current source 219 and current mirror 217. When reset, latch 309 outputs an enable/disable signal which disables fixed current source 219 and current mirror 217. Within latch 309, a set command takes priority over a reset command. The operation of enable/disable circuit 301 is now described.

As previously indicated, logic circuit 35 turns switching transistor 29 OFF in response to a voltage pulse output by oscillator 39 or in response to a switch turnoff signal from comparator 49. In either case, the falling edge of a voltage signal from driver circuit 37 is produced at the base of switching transistor 29. In response to the falling edge from driver circuit 37, one shot 303 outputs a first pulse of a first duration. This first pulse serves as an enable delay as described below.

The falling edge of the first pulse triggers one shot 305 which outputs a second pulse of a second duration. The second pulse places and maintains latch 309 in a set condition for the duration of the second pulse (recall that the set command overrides the reset command within latch 309). The duration of the second pulse output by one shot 305 serves as a minimum enable time by allowing control voltage capacitor 221 to charge during startup. That is, when flyback regulator 11 first turns ON, control voltage capacitor 221 may not be charged. In order for feedback error amplifier 45 to operate properly, $V_c$ must be above some nominal level (e.g., non-zero). For instance, if $V_c$ is too small, comparator 49 will cause switching transistor 29 to turn OFF almost immediately after turning ON. Insufficient energy will be stored within primary winding 15 to produce a flyback voltage pulse of sufficient duration to charge control voltage capacitor 221. As such, comparator 49 will continue to turn OFF switching transistor 29 too rapidly. The minimum enable time allows control voltage capacitor 221 sufficient time to charge (via fixed current source 219) despite the absence of a flyback voltage pulse, and prevents lockup of the flyback error amplifier during regulator startup.

Because one shot 305 does not output the second pulse until it detects the falling edge of the first pulse, latch 309 is not set immediately after switching transistor 29 turns OFF. Instead, latch 309 is set after a delay equal to the duration of the first pulse output by the one shot 303. Flyback error amplifier 45 remains disabled during this time period. Accordingly, the initial portion of the flyback voltage pulse does not alter $V_c$ present across control voltage capacitor 221 because the initial portion of the flyback voltage pulse is effectively "blanked" by one shot 303. This blanking of a portion of the flyback voltage pulse is required to ignore a voltage spike produced by the leakage inductance of primary winding 15 when switching transistor 29 first turns OFF (as described in more detail below with reference to FIG. 3B).

Latch 309 is reset by a collapse signal from collapse comparator 307. Collapse comparator 307 monitors the flyback reference voltage present at reference node 205. When the flyback reference voltage drops below a percentage of the internal reference voltage (preferably below 80% of $V_{BG}$ as shown in FIG. 3A), collapse comparator 307 generates a collapse signal that resets latch 309. In the absence of an overriding SET command from one shot 305, resetting latch 309 disables fixed current source 219 and current mirror 217 and prevents Vc from being altered in the absence of the flyback voltage pulse.

Figure 3B:
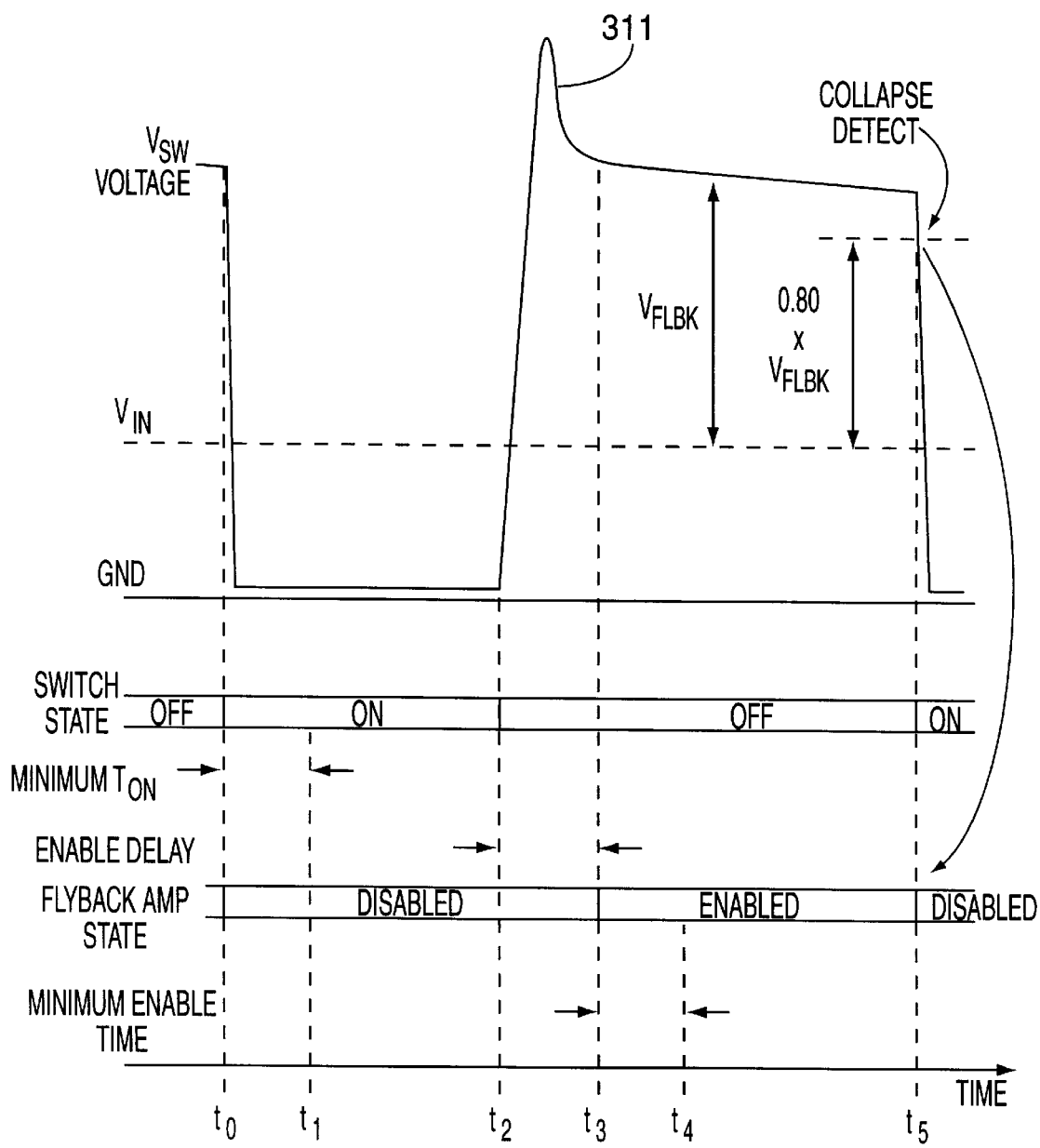
FIG. 3B is a timing diagram of the collector voltage of the switching transistor of FIGS. 1–3A during an ON-OFF cycle.

FIG. 3B shows a graph of the voltage produced at the collector of switching transistor 29 ($V_{SW}$) when switching transistor 29 turns ON and OFF. Specifically, at time $t_0$, switching transistor 29 turns ON. At this time, current begins to flow through primary winding 15, switching transistor 29 and sense resistor 33, and energy is stored in primary winding 15 (as previously described).

For stable operation of flyback regulator 11, switching transistor 29 must remain on long enough to allow at least a minimum amount of energy to be stored in primary winding 15 (i.e., the minimum output switch on time ($T_{ON}$)). Specifically, enough energy must be stored in primary winding 15 to produce a flyback voltage pulse indicative of $V_{OUT}$. Otherwise, there will be no feedback information provided to the unregulated input side of flyback regulator 11. $T_{ON}$ is represented by the time period between $t_0$ and $t_1$ in FIG. 3B. Circuitry that may be used for ensuring that switching transistor 29 remains turned ON for the minimum output switch on time ($T_{ON}$) is well known in the art.

During the time periods from $t_0$ to $t_1$ and $t_1$ to $t_2$, switching transistor 29 remains ON and flyback error amplifier 45 is disabled. At time $t_2$, switching transistor 29 turns OFF and one shot 303 detects a falling edge at the base of switching transistor 29. In response to switching transistor 29 turning OFF, a flyback voltage pulse is produced at time $t_2$. In response to detecting the falling edge, shot 303 outputs the first pulse.

As shown in FIG. 3B, between times $t_2$ and $t_3$ the flyback voltage pulse exhibits a non-linear voltage spike 311. Non-linear voltage spike 311 results from the leakage inductance of primary winding 15, and convolutes the relationship between $V_{OUT}$ and the flyback voltage pulse. Non-linear voltage spike 311 exists only during the time period from $t_2$ to $t_3$. Because non-linear voltage spike 311 provides no useful information about $V_{OUT}$, flyback error amplifier 45 is disabled during its presence by the delay introduced by one shot 303. This delay is designated "enable delay" in FIG. 3B.

At time $t_3$, the falling edge of the first pulse output by one shot 303 is detected by one shot 305. In response thereto, one shot 305 outputs the second pulse for the second duration (between times $t_3$ to $t_4$ in FIG. 3B). At time $t_3$, latch 309 is set and flyback error amplifier 45 is enabled (enabling fixed current source 219 and current mirror 217). Between times $t_3$ and $t_4$, latch 309 is forcibly maintained in the set condition to the second pulse so that flyback error amplifier 45 remains enabled regardless of the presence or absence of the flyback voltage pulse (as previously described). The time period from $t_3$ to $t_4$ is designated "minimum enable time" in FIG. 3B. Between times $t_4$ and $t_5$, latch 309 may be reset and flyback error amplifier 45 disabled.

Between times $t_3$ and $t_5$, current flows on the secondary side of transformer 13 as energy is transferred from primary winding 15 to output capacitor 19. The secondary current ($I_{SEC}$) linearly decreases during this time period. The flyback voltage pulse also linearly decreases during this time period due to energy loss to lump sum impedance 23 (ESR) as shown in FIG. 3B and as predicted by equation (1):

$$V_{FLBK} = \frac{(V_{out} + V_F + I_{SEC}ESR)}{N_{sp}} \quad (11)$$

At time $t_5$, the energy (e.g., substantially all of the energy in discontinuous mode and a portion of the energy in continuous mode) stored in primary winding 15 during the ON cycle of switching transistor 29 has been transferred to secondary winding 17, and the flyback voltage pulse begins to collapse. When the flyback reference voltage present at reference node 205 collapses below a percentage of the internal reference voltage (e.g., 80% of $V_{BG}$), collapse detector 307 generates a collapse signal that resets latch 309. As previously described, resetting latch 309 (in the absence of an overriding SET command from one shot 305) disables flyback error amplifier 45 and precludes $V_C$ from being altered. Thus, enable/disable circuit 301 provides the required timing and control signals for ensuring stable operation of flyback error amplifier 11.

Figure 4:
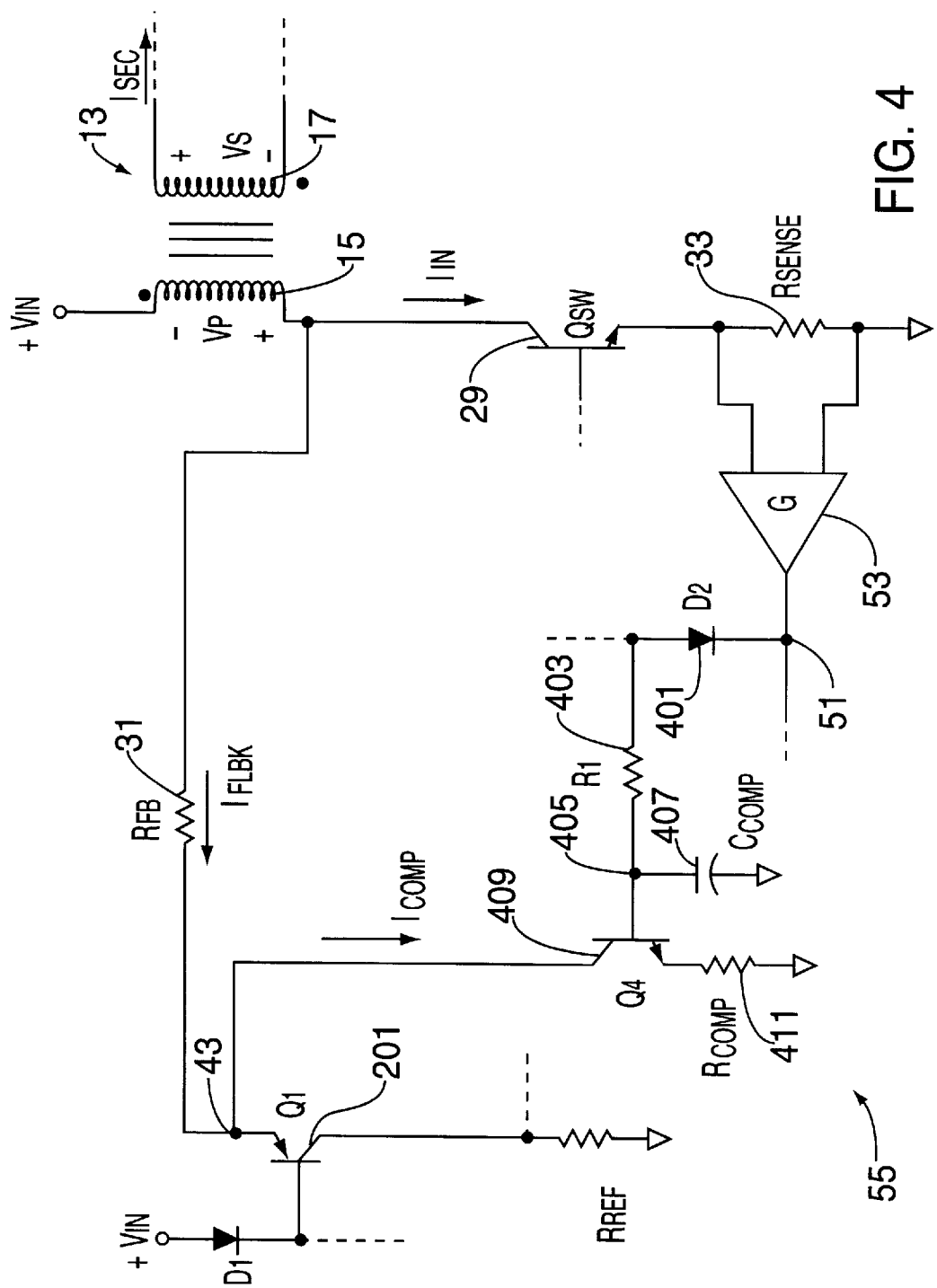
FIG. 4 is a schematic diagram of an embodiment of the load compensation circuit of FIG. 1.

FIG. 4 shows a schematic diagram of an embodiment of load compensation circuit 55. Load compensation circuit 55 comprises diode 401 connected to node 51, resistor 403 connected between diode 401 and node 405, compensation capacitor 407 connected between node 405 and ground, and transistor 409 having its base connected to node 405, its collector connected to node 43, and its emitter connected to ground through compensation resistor 411.

As previously stated, the sense voltage (generated by sense resistor 33 when switching transistor 29 is turned on) is amplified by current amplifier 53 and fed to node 51. The amplified sense voltage at node 51 is then fed to both comparator 49 and load compensation circuit 55. One significant advantage of load compensation circuit 55, therefore, is that it uses circuitry already present in most current mode switching regulators (e.g., sense resistor 33 and current amplifier 53) to obtain a measure of the input current flowing in flyback regulator 11. This reduces the cost and size of load compensation circuit 55.

The operation of load compensation circuit 55 is as follows. The sense voltage at node 51 is level shifted by diode 401 and averaged by a low pass filter formed by resistor 403 and compensation capacitor 407. The low pass filter generates a compensation voltage at node 405 that represents the average current flowing through switching transistor 29. This compensation voltage (minus the forward voltage of the emitter-base diode of transistor 409) is impressed across compensation resistor 411. Compensation resistor 411 is selected (as described below) so as to generate a compensation current ($I_{COMP}$) on the collector side of transistor 409 which compensates for flyback voltage pulse contributions from lumped sum impedance 23 on the secondary of transformer 13. $I_{COMP}$ is subtracted from the flyback current ($I_{FLBK}$) (generated by feedback resistor 31) at node 43. The flyback voltage pulse is therefore effectively reduced by $I_{COMP}$ so as to compensate for any lumped sum impedance 23 contributions to the flyback voltage pulse.

Compensation resistor 411 is selected based on a number of factors such as regulator efficiency, the ON-OFF cycle of switching transistor 29, the gain of current amplifier 53, and the like. An appropriate value for compensation resistor 411 may be computed using the following expression:

$$R_{COMP} = \frac{K_1 R_{SENSE} G R_{FB}}{R_{OUT}} \quad (12)$$

where $K_1 = V_{OUT}/(V_{IN}\text{Eff})$, Eff=the fixed efficiency of flyback regulator 11, $R_{SENSE}$=sense resistor 33, G=the gain of current amplifier 53, $R_{FB}$=feedback resistor 31, $R_{OUT}$=ESR/$DC_{OFF}$, ESR=lumped sum impedance 23, and $DC_{OFF}$ is the OFF duty cycle of switching transistor 29 (e.g., the time period during which lumped sum impedance 23 influences the flyback voltage pulse).

As stated, when a bias winding is employed with flyback error amplifier 45 (FIG. 2B), node 43 no longer exists, and load compensation can be provided by alternative means. For example, the collector of transistor 409 (in load compensation circuit 55) may be connected (through a current mirror) so that the collector current of transistor 409 ($I_{COMP}$) sources current into a resistor (R) connected between the base of transistor 209 and the internal reference voltage ($V_{BG}$) (FIG. 2B). In this manner, the voltage developed at the base of transistor 209 equals $V_{BG}$ plus the product of R times $I_{COMP}$. Proper scaling of the resistor/collector current product ($I_{COMP}R$) effects load compensation in such a topology. Other alternative implementations are possible.

As previously described, a significant advantage of load compensation circuit 55 is that it provides load compensation which is essentially independent of the first and second feedback loops. The feedback loop stability of flyback regulator 11 is therefore unaffected by the impedance values of any of the components comprising load compensation circuit 55. For instance, compensation capacitor 407 (responsible for averaging the sense voltage) may be made arbitrarily large without compromising the stability of flyback regulator 11.

Although preferred embodiments of the invention have been disclosed, with various components connected to other components, persons skilled in the art will appreciate that it may not be necessary for such connections to be direct and additional components may be interconnected between the shown connected components without departing from the spirit of the invention as shown. Persons skilled in the art will appreciate also that the present invention can be practiced by other than the described embodiments. The described embodiments are presented for purposes of illustration and not of limitation, and the present invention is limited only by the claims which follow.

The invention claimed is:

1. A flyback error amplifier circuit for use in a switching voltage regulator, the switching voltage regulator having a switching element, control circuitry which turns the switching element ON and OFF, and a transformer which couples an output side of the switching voltage regulator to an input side of the switching voltage regulator, the transformer generating a flyback voltage pulse across the input side of the transformer when the switching element is turned OFF, the flyback error amplifier comprising:

a scaling circuit that produces a scaled flyback voltage pulse from the flyback voltage pulse generated on the input side of the transformer when the switching element is turned OFF; and adjustment circuitry, operatively coupled to the scaling circuit and the control circuitry, that compares the scaled flyback voltage pulse to an internal reference, for generating a difference signal based on the comparison, for integrating a portion of the difference signal, and for adjusting the ON-OFF cycle of the switching element based on the integrated portion of the difference signal.

2. The flyback error amplifier circuit defined in claim 1 wherein the scaling circuit comprises:

a voltage-to-current converter that converts the flyback voltage pulse to a flyback current pulse; and an impedance element, operatively coupled to the voltage-to-current converter, that generates the scaled flyback voltage pulse based on the flyback current pulse.

3. The flyback error amplifier circuit defined in claim 2 wherein the impedance element is a ground-referenced impedance element so that the scaled flyback voltage pulse is a ground-referenced voltage pulse.

4. The flyback error amplifier circuit defined in claim 1 wherein the flyback voltage pulse generated on the input side of the transformer is generated across a primary winding of t he transformer.

5. The flyback error amplifier circuit defined in claim 1 wherein the flyback voltage pulse generated on the input side of the transformer is generated across a bias winding of the transformer.

6. The flyback error amplifier circuit defined in claim 1 wherein the adjustment circuitry comprises:

a current mode trip point circuit having a current mode trip point, the current mode trip point circuit comprising:

a reference circuit that compares the scaled flyback voltage pulse to an internal reference voltage and generates the difference signal based on the comparison; and modification circuitry, operatively coupled to the reference circuit, that integrates the difference signal and adjusts the current mode trip point based on the integrated difference signal.

7. The flyback error amplifier circuit defined in claim 6 wherein the internal reference voltage is a bandgap reference voltage.

8. The flyback error amplifier circuit defined in claim 6 wherein the difference signal is a difference current.

9. The flyback error amplifier circuit defined in claim 8 wherein the reference circuit comprises:

a differential amplifier transistor pair that compares the scaled flyback voltage pulse to the internal reference voltage and generates the difference current based on the comparison; and at least one current mirror, operatively coupled to the differential amplifier transistor pair, that mirrors the difference current generated by the differential amplifier transistor pair.

10. The flyback error amplifier circuit defined in claim 8 wherein the modification circuitry comprises:

a capacitor with a charged state having an associated capacitor voltage, the capacitor voltage serving as the current mode trip point of the switching voltage regulator;

a current source that produces a first current; and a current node operatively coupled to the capacitor, the current source and the reference circuit generating a second current equal to the first current minus the difference current, the second current altering the charged state of the capacitor so as to adjust the current mode trip point of the switching voltage regulator.

11. The flyback error amplifier circuit defined in claim 1 further comprising:

an enabling circuit, operatively coupled to the adjustment circuitry, that enables the adjustment circuitry during the presence of the flyback voltage pulse and disables a portion of the adjustment circuitry during the absence of the flyback voltage pulse.

12. The flyback error amplifier circuit defined in claim 11 wherein the enabling circuit comprises:

a latch operatively coupled to the adjustment circuitry, the latch enabling the adjustment circuitry when in a first state and disabling a portion of the adjustment circuitry when in a second state;

an enable delay, operatively coupled to the latch, that blanks a first portion of the flyback voltage pulse for a first time period by maintaining the latch in the second state for the first time period;

a minimum time enable circuit, operatively coupled to the latch, that enables the adjustment circuitry for a second time period by maintaining the latch in the first state for the second time period even during the absence of the flyback voltage pulse; and a collapse comparator, operatively coupled to the latch and the scaling circuit, that generates a collapse signal when the scaled flyback voltage pulse drops below a threshold level, the collapse signal placing the latch in the second state so as to disable the portion of the adjustment circuitry.

13. The flyback error amplifier circuit defined in claim 1 further comprising:

a current-to-voltage converter that generates a compensation voltage based on an input current that flows through the input side of the transformer when the switching element is turned ON; and a compensation circuit, operatively coupled to the current-to-voltage converter and the adjustment circuitry, that adjusts the magnitude of the flyback voltage pulse based on the compensation voltage so as to compensate for non-zero impedances on the output side of the switching voltage regulator.

14. The flyback error amplifier circuit defined in claim 13 further comprising a voltage-to-current converter for converting the flyback voltage pulse to a flyback current and wherein the compensation circuit comprises:

a current source, operatively coupled to the current-to-voltage converter, that generates a compensation current based on the compensation voltage, the compensation current being related to non-zero impedances on the output side of the switching voltage regulator; and a current node, operatively coupled to the current source and the voltage-to-current converter, that reduces the flyback current by the compensation current so as to reduce the scaled flyback voltage pulse.

15. The flyback error amplifier circuit defined in claim 13 further comprising:

a low pass filter, operatively coupled to the current-to-voltage converter, that filters the compensation voltage so that the compensation voltage is related to an average of the input current which flows through the input side of the transformer.

16. A flyback error amplifier circuit for use in a switching voltage regulator, the switching voltage regulator having a switching element, control circuitry which turns the switching element on and off, and a transformer having a primary winding which couples an input side of the switching voltage regulator and a secondary winding which couples an output side of the switching voltage regulator, the transformer generating a flyback voltage pulse across the primary winding when the switching element is turned off, the flyback error amplifier comprising:

a scaling circuit that produces a scaled flyback voltage pulse based on the flyback voltage pulse generated across the primary winding of the transformer when the switching element is turned OFF; and adjustment circuitry, operatively coupled to the scaling circuit and the control circuitry, that compares the scaled flyback voltage pulse to an internal reference and adjusts the ON-OFF cycle of the switching element based on the comparison.

17. A load compensation circuit for use in a switching voltage regulator, the switching voltage regulator having a switching element, control circuitry which turns the switching element on and off, and a transformer which couples an output side of the switching voltage regulator to an input side of the switching voltage regulator, the transformer generating a flyback voltage pulse across the input side of the transformer when the switching element is turned off and generating an input current which flows through the input side of the transformer when the switching element is turned on, the load compensation circuit comprising:

a current-to-voltage converter that generates a compensation voltage based on the input current flowing through the input side of the transformer when the switching element is turned ON;

a low pass filter operatively, coupled to the current-to-voltage converter, that filters the compensation voltage so that the compensation voltage is related to an average of the input current within flows through the input side of the transformer; and an adjustment circuit, operatively coupled to the low pass filter and the input side of the transformer, that adjusts the magnitude of the flyback voltage pulse so as to compensate for non-zero impedances on the output side of the switching voltage regulator.

18. The load compensation circuit defined in claim 17 wherein the adjustment circuit comprises:

a current source, operatively coupled to the low pass filter, that generates a compensation current based on the filtered compensation voltage, the compensation current being related to non-zero impedances on the output side of the switching voltage regulator; and a current node, coupled to a voltage-to-current converter of the switching voltage regulator, that converts the flyback voltage pulse to a flyback current and to the current source, that reduces the flyback current by the compensation current so as to produce a reduced flyback current, the reduced flyback current being fed to a current-to-voltage converter of the switching voltage regulator operatively coupled to the current node, the current-to-voltage converter converting the reduced flyback current to a reduced flyback voltage pulse.

19. An enable circuit for use in a switching voltage regulator having adjustment circuity, the adjustment circuitry allowing a flyback voltage pulse to be used by the voltage regulator for voltage regulation, the enabling circuit comprising:

a latch, operatively coupled to the adjustment circuitry, that enables the adjustment circuitry when in a first state and disables a portion of the adjustment circuitry when in a second state;

an enable delay, operatively coupled to the latch, that blanks a first portion of the flyback voltage pulse for a first time period by maintaining the latch in the second state for the first time period;

a minimum time enable circuit operatively coupled to the latch, that enables the adjustment circuitry for a second time period by maintaining the latch in the first state for the second time period even during the absence of the flyback voltage pulse; and a collapse comparator, operatively coupled to the latch, that generates a collapse signal when the flyback voltage pulse drops below a threshold level, the collapse signal placing the latch in the second state so as to disable the portion of the adjustment circuitry.

20. A method of voltage regulation for a flyback switching regulator having a switching element, control circuitry which turns the switching element on and off, and a transformer which couples an output side of the switching voltage regulator to an input side of the switching voltage regulator, the transformer generating a flyback voltage pulse across the input side of the transformer when the switching element is turned off, the method comprising steps of:

scaling the flyback voltage pulse generated on the input side of the transformer when the switching element is turned OFF so as to produce a scaled flyback voltage pulse;

providing an internal reference;

comparing the scaled flyback voltage pulse to the internal reference;

generating a difference signal based on the comparison of the scaled flyback voltage pulse to the internal reference;

integrating a portion of the difference signal; and adjusting the ON-OFF cycle of the switching element based on the integrated portion of the difference signal.

21. The method of voltage regulation defined in claim 20 wherein the step of scaling comprises:

converting the flyback voltage pulse to a flyback current pulse; and generating the scaled flyback voltage pulse by flowing the flyback current pulse through an impedance element.

22. The method of voltage regulation defined in claim 20 wherein the step of providing the internal reference comprises the step of providing a bandgap reference voltage.

23. The method of voltage regulation defined in claim 20 wherein the step of generating the difference signal comprises the step of generating a difference current.

24. The method of voltage regulation defined in claim 23 wherein the step of adjusting the ON-OFF cycle of the switching element comprises the steps of:

providing a capacitor with a charged state and an associated capacitor voltage;

providing a current source;

producing a first current with the current source;

providing a current node;

coupling the capacitor and the current source with the current node;

producing a second current by subtracting the difference current from the first current at the current node;

altering the charged state of the capacitor with the second current; and using the capacitor voltage as a current mode trip point for the flyback switching regulator.

25. The method of voltage regulation defined in claim 20 further comprising the steps of:

enabling the integration of the portion of the difference signal during the presence of the flyback voltage pulse; and disabling the integration of the portion of the difference signal during the absence of the flyback voltage pulse.

26. The method of voltage regulation defined in claim 20 further comprising the steps of:

disabling the integration of the portion of the difference signal during a first portion of the flyback voltage pulse for a first time period so as to blank the first portion of the flyback voltage pulse;

enabling the integration of the portion of the difference signal for a second time period even during the absence of the flyback voltage pulse; and disabling the integration of the portion of the difference signal when the scaled flyback voltage pulse drops below a threshold level.

27. The method of voltage regulation defined in claim 20 further comprising the steps of:

generating a compensation voltage based on an input current that flows through the input side of the flyback switching regulator's transformer when the switching element is turned ON; and adjusting the magnitude of the flyback voltage pulse based on the compensation voltage so as to compensate for non-zero impedances on the output side of the flyback switching regulator.

28. The method of voltage regulation defined in claim 27 further comprising the step of:

low pass filtering the compensation voltage so that the compensation voltage is related to an average of the input current that flows through the input side of the transformer.

29. A method of voltage regulation for a flyback switching regulator having a switching element, control circuitry which turns the switching element on and off, and a transformer having a primary winding which couples an input side of the switching voltage regulator and a secondary winding which couples an output side of the switching voltage regulator, the transformer generating a flyback voltage pulse across the primary winding when the switching element is turned off, the method of isolated feedback regulation comprising:

scaling the flyback voltage pulse generated across the primary winding of the transformer when the switching element is turned OFF so as to produce a scaled flyback voltage pulse;

providing an internal reference;

comparing the scaled flyback voltage pulse to the internal reference; and adjusting the ON-OFF cycle of the switching element based on the comparison.

30. A method of load compensation for a switching voltage regulator, the switching voltage regulator having a switching element, control circuitry which turns the switching element on and off, and a transformer which couples an output side of the switching voltage regulator to an input side of the switching voltage regulator, the transformer generating a flyback voltage pulse across the input side of the transformer when the switching element is turned off and generating an input current which flows through the input side of the transformer when the switching element is turned on, the method of load compensation comprising the step of:

adjusting the flyback voltage pulse to compensate for non-zero impedances on the output side of the transformer without degrading the response time of at least one of a current mode feedback loop and a voltage mode feedback loop of the switching regulator.

31. The method of load compensation defined in claim 30 wherein the step of adjusting comprises the steps of:

obtaining an average of the input current which flows through the input side of the transformer when the switching element is turned ON;

generating a compensation current based on the average input current and non-zero impedances on the output side of the transformer;

converting the flyback voltage pulse to a flyback current;

adjusting the flyback current with the compensation current; and generating a scaled flyback voltage pulse based on the adjusted flyback current.

* * * * *